P. HALLE.
FILTER FOR OILS, &c.

No. 48,172.  Patented June 13, 1865.

Witnesses.
W. W. Baldwin
J. S. Peyton

Inventor.
Philipp Halle

UNITED STATES PATENT OFFICE.

PHILIPP HALLE, OF PHILADELPHIA, PENNSYLVANIA.

IMPROVED FILTER FOR OILS, &c.

Specification forming part of Letters Patent No. 48,172, dated June 13, 1865.

*To all whom it may concern:*

Be it known that I, PHILIPP HALLE, of the city and county of Philadelphia, and State of Pennsylvania, have invented a new and useful Improvement in Filters for Purifying Oils; and I do hereby declare that the following is a full, clear, and exact description of the construction and operation of the same, reference being had to the annexed drawings, making a part of this specification, in which—

Figure 1:
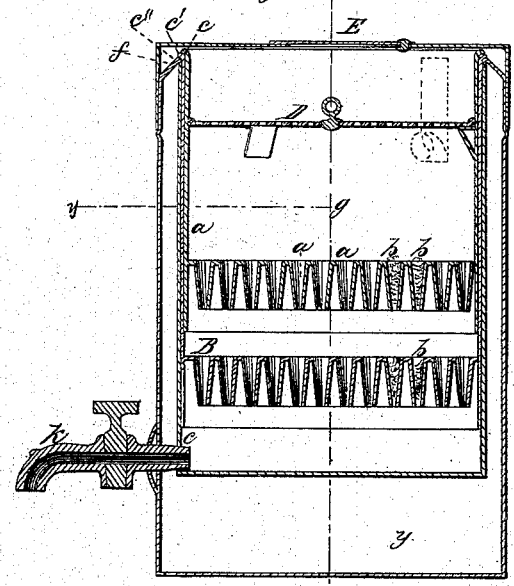
Figure 3:
Figure 2:
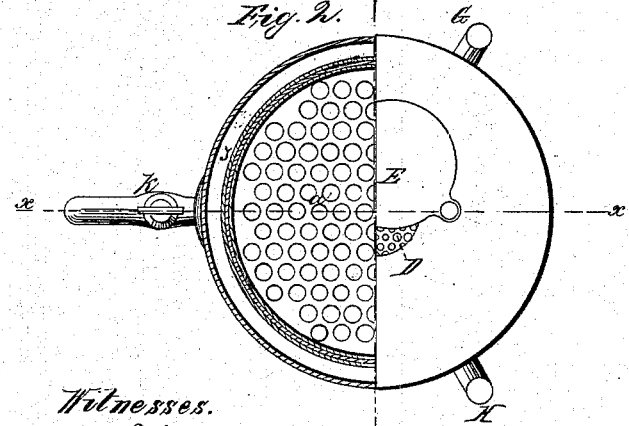
Figure 4:
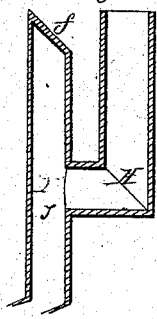

Figure 1 is a vertical section of my invention. Fig. 2 is a plan view and section combined of my filter. Fig. 3 is a plan and elevation of one of the conical tubes; and Fig. 4 is a view, in part, of the space between the walls of the outer case of the filter and escape-pipe when heat is to be employed.

It is the object of my invention to simplify the filter for purifying oils, to render it adaptable to all oils, however variable in density, and employ as a filtering medium a raw fibrous material with the utmost economy; and to this end my invention consists in the employment of a series of filtering vessels or tanks having their bottoms fitted with conical tubes fitted with raw cotton, and so arranged as to be placed one within another and all within a hot-air or steam jacket, that any desired degree of heat may be applied to the filters to purify dense or heavy oils, whether animal, vegetable, or mineral.

Like letters of reference refer to like parts in all the figures of the drawings.

I construct my filter of any suitable material, but prefer metallic to wooden vessels. In the drawings the filter is represented as made of sheet metal, and consists of three vessels, A, B, and C, one within the other, A and B being removable and capable of being used separately or together, with or without being in C, as shown in Fig. 1. I construct a plane-sided vessel, A, and rivet a diaphragm, $a$, fitted with conical tubes $a'$, open at both ends, of a length adapted to the size of the filter, so that all the oil placed in A can only pass therefrom through the conical tubes $a'$, and these tubes I fill with plugs $b$, of raw cotton, packed more or less tightly to adapt the filter to the rapidity of work desired or a greater or less degree of purification required. Near the top of the filter A, I insert a perforated diaphragm, D, which rests on clips or projections $d$, fastened on the inside of the filter A, the purpose of this diaphragm D being to strain the oil and arrest any and all coarse particles that may have been associated with it when placed in the filter. The top of the filter A may have a cap or cover perforated to receive a funnel or permit oil to be poured or run through from any tank or from the barrels of crude mineral or other oils. This perforation may have a cap, E, to turn on a screw or rivet, and when opened it will permit oil to run into the filter, and when closed will exclude dust.

The filter A when thus constructed may be used alone or in a series of any number desired, arranged on different planes, so that the oil will pass by its own gravity from one to the other through the whole number; or they may be arranged in series, the one within the other, as A and B are in the drawings.

For the lighter oils the arrangement of my filters in series in either mode will be found effective in perfectly purifying such oils as are passed through them; but when the more dense fats—such as tallow or lard or the heavier coal-oils or naphthas—are to be purified by filtration heat is necessary, and this I supply in the following manner:

A double-walled vessel, F, is constructed of two cylinders of sizes varying sufficiently to admit a space between them. These, when the smaller is placed within the larger, are both closed at their bottoms, and the space between them is closed at the top by a band, $f$, properly secured, and thus they render the space between the walls a close chamber, into which heated air or steam or hot water may be admitted through the pipe G and escape at the pipe H, the latter being shown on a larger scale in Fig. 4 as connected to the walls of the vessels and communicating with the air-space F. It is obvious that when steam is used the water of condensation may be withdrawn through a faucet near the bottom of the chamber, and that when hot water is used it may be passed in a continuous stream through between the walls of the vessel; or the vessel may be placed directly over a properly-constructed grating, and the water within it may be kept at the temperature desired by the direct application of ignited fuel.

In the vessel thus constructed I place one or more of my filters, which, where more than one is used, must be made to fit each other neatly, and may be supported on their flanges $c$ and $c'$ on the top $c''$ of the vessel F; but at the same time they must be capable of being easily withdrawn from each other and from the vessel F, that they may be separated for cleaning or for replacing the cotton within the conical tubes when new packing may be required.

A cock or faucet may be placed through both walls of the vessel K, just above the bottom of its inner cylinder.

The operation is obvious: When, for example, crude petroleum is to be purified the filter A is placed in filter B, the conical tubes in each having previously all been carefully packed with raw cotton, and both filters are then placed within the vessel F. The petroleum is now permitted to run from the barrel into the top of the filter A, and as it passes over the perforated diaphragm D it will leave thereon all the coarse matter that may have been associated with it in the barrel and fall through the perforations to the bottom of the filter A, when it will percolate through the raw cotton in the conical tubes to the bottom of the filter B and through its tubes to the bottom of the inmost cylinder of the vessel F, where it can be received through the cock K into any suitable vessel, entirely separated from all impurities that the filter can remove. Should the petroleum be very dense, steam, heated air, or hot water may be kept flowing between the walls of the vessel F at any temperature required to keep the oil sufficiently fluid to filter perfectly. In filtering mineral oils they may at times be found to contain a quantity of paraffine sufficient to be profitably separated in the filter, and then it is obvious that my filter may be advantageously used for this purpose simply by passing a current of cold fluid through the walls of the vessel F, and that thus the temperature may be so reduced within the filters as economically to separate the paraffine, which can be easily removed from time to time as it may accumulate in the filters A or B.

What I claim as my invention, and desire to secure by Letters Patent of the United States, is—

1. A filter for purifying oils, consisting of a close chamber having a perforated-diaphragm top and a diaphragm bottom composed of a number of conical tubes fitted with raw cotton, substantially in the manner described.

2. The use of raw cotton in conical tubes, substantially in the manner and for the purpose set forth.

3. The combination of a series of two or more filters constructed substantially in the manner described, for the purpose set forth.

4. The combination of one or more filters, constructed substantially in the manner described, with a heating or refrigerating vessel constructed and arranged substantially in the manner described, for the purposes set forth.

In testimony whereof I have hereunto subscribed my name.

PHILIPP HALLE.

Witnesses:
   JOS. I. PEYTON,
   WM. D. BALDWIN.